(12) United States Patent
Pollock et al.

(10) Patent No.: US 7,640,667 B2
(45) Date of Patent: Jan. 5, 2010

(54) HAND TOOLS (75) Inventors: Nathan Pollock, Victoria (AU); James Collins, Victoria (AU); Lee Rodezno, Victoria (AU); Peter Williams, New South Wales (AU)

(73) Assignee: ITW Australia Pty Ltd, Victoria (AU)

( * ) Notice: Subject to any disclaimer, the term of this patent is extended or adjusted under 35 U.S.C. 154(b) by 0 days.

(21) Appl. No.: 11/627,292

(22) Filed: Jan. 25, 2007

(65) Prior Publication Data
US 2008/0016701 A1 Jan. 24, 2008

(30) Foreign Application Priority Data
Jul. 21, 2006 (AU) .............. 2006903958

(51) Int. Cl.
*B26B 13/28* (2006.01)
*B26B 13/00* (2006.01)
*B25B 7/06* (2006.01)

(52) U.S. Cl. ............... 30/267; 30/266; 30/268; 30/252; 30/254; 81/416

(58) Field of Classification Search ........... 30/266–268, 30/234, 239, 252, 254, 249, 261; 81/416, 81/417
See application file for complete search history.

(56) References Cited

U.S. PATENT DOCUMENTS

| | | | |
|---|---|---|---|
| 298,548 A | | 5/1884 | Bubach |
| 1,814,821 A | * | 7/1931 | Botts ..................... 30/261 |
| 2,251,548 A | * | 8/1941 | Dalley .................... 30/268 |
| 2,582,184 A | * | 1/1952 | Wheeler .................. 30/230 |
| 3,355,200 A | * | 11/1967 | Storch ................... 403/145 |
| 3,461,555 A | * | 8/1969 | Bliznak ................... 30/254 |
| 3,672,053 A | | 6/1972 | Wiss |
| 3,740,846 A | * | 6/1973 | Duffy ..................... 30/267 |
| 4,156,311 A | | 5/1979 | Gosselin |
| D266,478 S | | 10/1982 | Bladen |
| D267,144 S | | 12/1982 | Harrison et al. |
| D268,982 S | | 5/1983 | Harrison et al. |
| 4,473,947 A | * | 10/1984 | Ishida et al. ............. 30/267 |
| 4,567,656 A | | 2/1986 | Wallace et al. |
| D289,250 S | | 4/1987 | Pittaway |
| D323,769 S | | 2/1992 | Ishida et al. |
| D336,412 S | | 6/1993 | Wensley et al. |

(Continued)

FOREIGN PATENT DOCUMENTS

GB 916412 * 1/1963

(Continued)

*Primary Examiner*—Bryan R Muller
(74) *Attorney, Agent, or Firm*—Lowe Hauptman Ham & Berner LLP (57) ABSTRACT

A pruner has a movable handle/blade assembly pivotally coupled to a static handle/blade assembly by a pivot assembly carried by the static handle. The pivot assembly further has a bush within the static handle and on which the movable handle/blade assembly is pivotally mounted, a spring for pivotally biasing the movable handle/blade assembly to an open position being retained by the pivot assembly within the static handle. Both the movable blade and static blade are mounted on the bush and are clamped laterally between two separate parts of the bush which are assembled together in screw threaded engagement, and the two blades are supported from the bush by a bearing ring of low friction material.

6 Claims, 6 Drawing Sheets

U.S. PATENT DOCUMENTS

| | | |
|---|---|---|
| D337,033 S | 7/1993 | DeVille |
| 5,243,762 A * | 9/1993 | Orthey .................. 30/254 |
| D341,527 S | 11/1993 | Clivio |
| 5,263,254 A | 11/1993 | Orthey |
| D342,657 S | 12/1993 | Choi |
| 5,335,418 A * | 8/1994 | Krivec ................... 30/266 |
| D354,890 S | 1/1995 | Concari et al. |
| D427,859 S | 7/2000 | Deville |
| 6,176,158 B1 * | 1/2001 | Chen ..................... 81/417 |
| D458,816 S | 6/2002 | Meyerratken |
| D463,227 S | 9/2002 | Choi |
| D467,476 S | 12/2002 | Lai et al. |
| D478,256 S | 8/2003 | Shih |
| D499,317 S | 12/2004 | Tatic |
| D500,236 S | 12/2004 | Albert et al. |
| D501,379 S | 2/2005 | Lipscomb et al. |
| D506,906 S | 7/2005 | Wu |

FOREIGN PATENT DOCUMENTS

GB  916412 A  1/1963

* cited by examiner

HAND TOOLS

BACKGROUND OF THE INVENTION

RELATED APPLICATIONS

The present application is based on, and claims priority from, Australian Application No. 2006903958, filed Jul. 21, 2006, the disclosure of which is hereby incorporated by reference herein in its entirety.

1. Field of the Invention

The present invention relates to hand tools and more particularly to hand tools for cutting plant material such as pruners (sometimes known as secateurs), garden shears and tree loppers.

2. Description of the Prior Art

Hand tools for cutting plant material, particularly pruners or secateurs, and garden shears conventionally comprise two co-operating blades interconnected by a pivot assembly. Typically, the pivot assembly consists of a bolt, pin or the like and this tends not to provide a particularly stable mounting for the blades especially when cutting thick or tough branches when there is a tendency for the blades to be forced laterally apart under the applied loading.

Moreover, in the case of pruners or secateurs which are designed to be held within a single hand of the user with one of the blades being a static blade and the other blade being a moveable blade, the pruner will normally incorporate a spring to bias the moveable blade to its open position. Conventionally the spring is in the form of a coil spring or volute spring mounted between the handles at the ends thereof adjacent the blades. The spring, being externally mounted, is prone to contamination by exposure to dirt and water and, also, it is sometimes possible for the finger of the user to become trapped in the spring during actuation of the pruner. These externally mounted springs also are prone to detachment from the pruner whereby the can become lost.

SUMMARY OF THE INVENTION

According to one aspect of the present invention there is provided a hand tool for cutting plant material, the tool having two co-operating blades interconnected by a pivot assembly whereby one blade is pivotal relative to the other blade between an open and closed position, the pivot assembly comprising a bush on which both blades are mounted with at least one of the blades being supported from the bush by a low friction bearing material, the bush comprising two parts assembled together so that the two blades are clamped together between opposed abutment faces on the two parts of the bush.

In a preferred embodiment of the invention, the two parts of the bush are screwed together.

The bearing is preferably in the form of a bearing ring which supports both blades from the bush. Preferably, the bearing ring is of T-shaped cross-section with a radial stem of the ring providing bearing support between adjacent lateral faces of the two blades.

In a particularly preferred embodiment of the invention the tool is a pruner having a static handle carrying a static blade and a movable handle carrying a movable blade. In this embodiment the pivot assembly also includes a spring to bias the movable blade to its open position. Preferably, the spring is a torsion spring, and this may take the form of a coil spring or other torsion spring mounted concentrically on the bush. The pivot assembly is mounted to the static handle with the bush passing through a transverse passage at the inner end portion of the static handle, and the bush is fixed to the static handle against rotation relative thereto. In this configuration, the coil spring is thereby enclosed within the transverse passage of the static handle and is shielded by the bush against detachment and against direct exposure to dirt and water; also the spring is shielded from contact with the fingers of the user and thereby "pinching" of the fingers by the spring cannot occur.

The bush is of large diameter which provides improved support and stability for the movable blade. Although the interior of the bush can be closed by a plug or similar, it is preferred to leave the interior of the bush open as this provides significant visual enhancement of the finished pruner.

According to another aspect of the invention there is provided a pruner having a movable handle/blade assembly pivotally coupled to a static handle/blade assembly by a pivot assembly carried by the static handle, wherein the pivot assembly comprises a bush within the static handle and on which the movable handle/blade assembly is pivotally mounted, the pivot assembly including a spring for pivotally biasing the movable handle/blade assembly to an open position, the spring being retained by the pivot assembly within the static handle.

Advantageously both the movable blade and static blade are mounted on the bush and are clamped laterally between two separate parts of the bush which are assembled together in screw threaded engagement. Preferably, the two blades are supported from the bush by a bearing ring of low friction material; advantageously, the ring is configured to provide bearing support between adjacent faces of the two blades.

Preferably, the spring is a coil spring mounted on the bush concentrically with the axis of the bush one end of the spring being anchored to the bush and the other end being anchored to the movable blade.

According to yet another aspect of the invention there is provided a pruner having a movable handle/blade assembly pivotally coupled to a static handle/blade assembly by a pivot assembly, wherein the pivot assembly comprises a bush within at least one of the handles and on which the movable handle/blade assembly is pivotally mounted, the pivot assembly including a spring for pivotally biasing the movable handle/blade assembly to an open position, the spring being retained within the bush or each handle so as to be shielded against direct exposure to dirt and water and contact with the user's fingers.

BRIEF DESCRIPTION OF THE DRAWINGS

Embodiments of the invention will now be described by way of example only with reference to the accompanying drawings in which.

DESCRIPTION OF THE PREFERRED EMBODIMENTS

There is shown in FIGS. 1 to 4 of the accompanying drawings a pruner for plant material. Pruners of this type are sometimes referred to as secateurs. The pruner comprises upper and lower handles 2, 4 each carrying a blade 6, 8. The blade 6 carried by the upper handle 2 forms a lower blade of the pruner and the blade 8 carried by the lower handle 4 forms an upper blade of the pruner. The corresponding handle/blade assemblies are connected in pivotal relationship by a pivot assembly 10 in accordance with the invention and which will be described in detail hereinafter. The pivot assembly also incorporates a spring by which the handles and blades are pivotally biased apart. As will be well understood pruners are operated by being held within a single hand of the user with the upper handle engaged by the thenar and the lower handle being held by the fingers so that when the fingers are flexed so as to close the handles and thereby operate the pruner, the lower handle and the corresponding upper blade which is attached to that handle pivot relative to the upper handle and lower blade carried thereby and which remain essentially static within the hand during a pruning action. Accordingly the lower handle 4 and its associated upper blade 8 will be referred to hereinafter as the moveable handle and blade, and the upper handle 2 and its associated blade 6 will be referred to as the static handle and blade.

Figure 5:
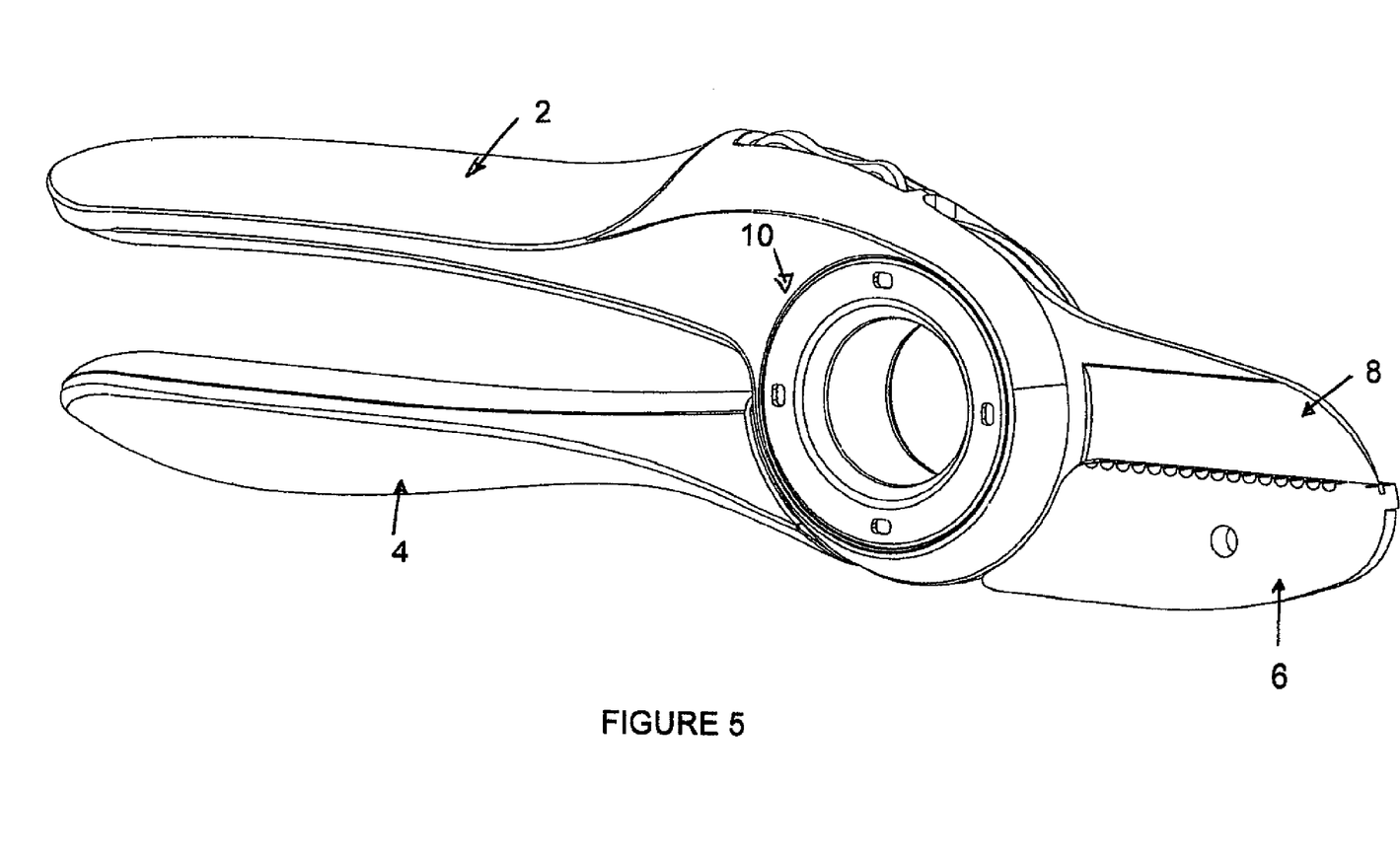
FIG. 5 is a perspective view of an anvil pruner in accordance with a further embodiment of the invention.
Figure 6:
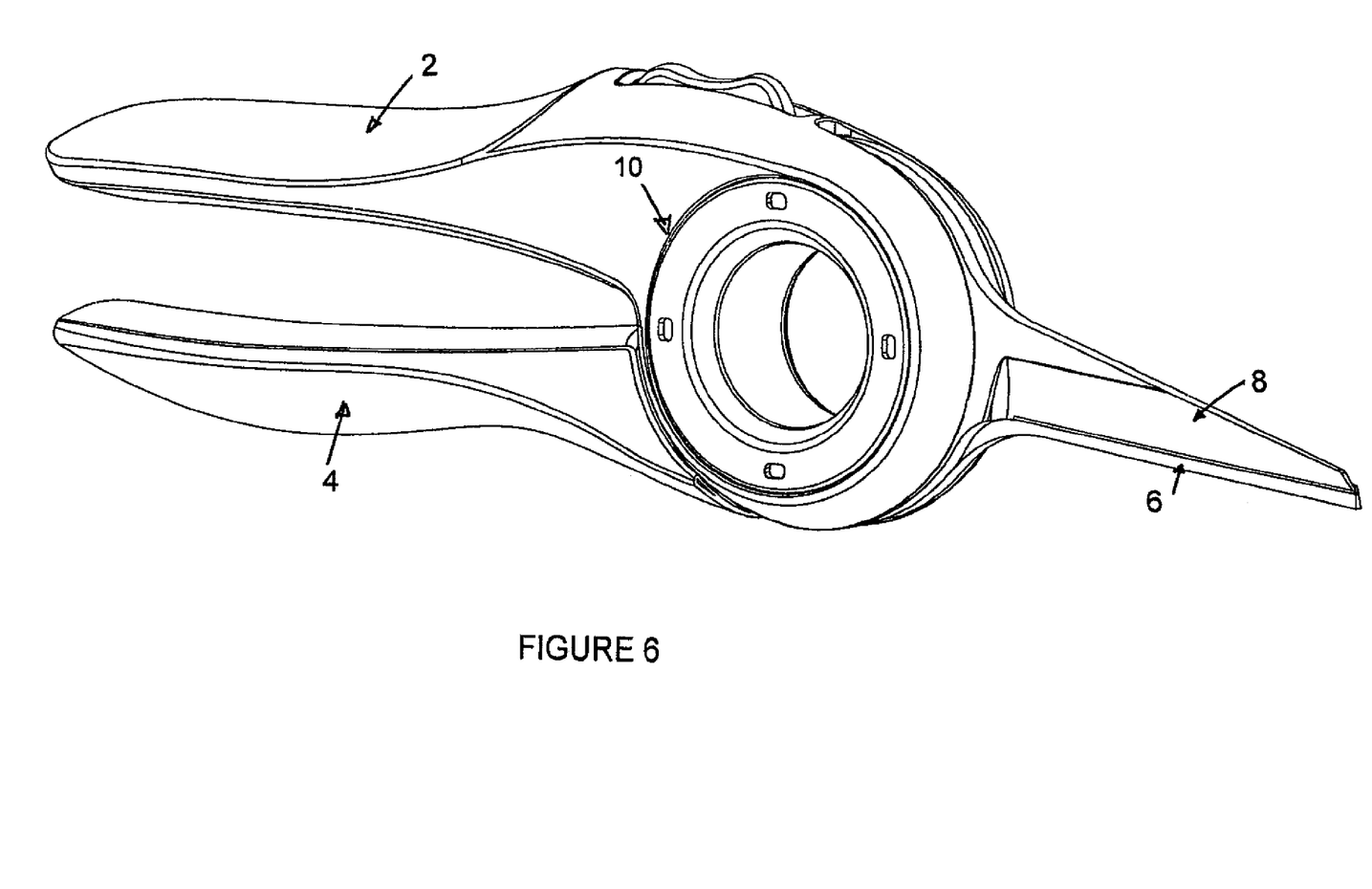
FIG. 6 is a perspective view of floral snips in accordance with yet another embodiment of the invention.

In the embodiment shown in FIGS. 1 to 4 the pruner is a so-called bypass pruner in which the moveable blade 8 is configured with a convex sharpened cutting edge, and the static blade 6 is un-sharpened and features a relatively wide concave upper surface which, during a pruning action, supports part of the plant stem being cut and does not itself make an incision. In other embodiments of the invention the operative parts of the blades may take a different configuration. For example in an anvil pruner (see FIG. 5) the cutting edge of the moveable blade 8 is substantially straight and the static blade 6 has an upper anvil surface against which the moveable blade engages in the fully closed condition, in contrast to the action which occurs in a bypass pruner in which the side of the moveable blade moves along the side of the fixed blade during closure, essentially with a shearing type action. In another embodiment of a pruner in the form of so-called floral snips (see FIG. 6), the moveable and static blades 8, 6 are configured to cooperate with a scissors-type cutting action.

Figure 1:
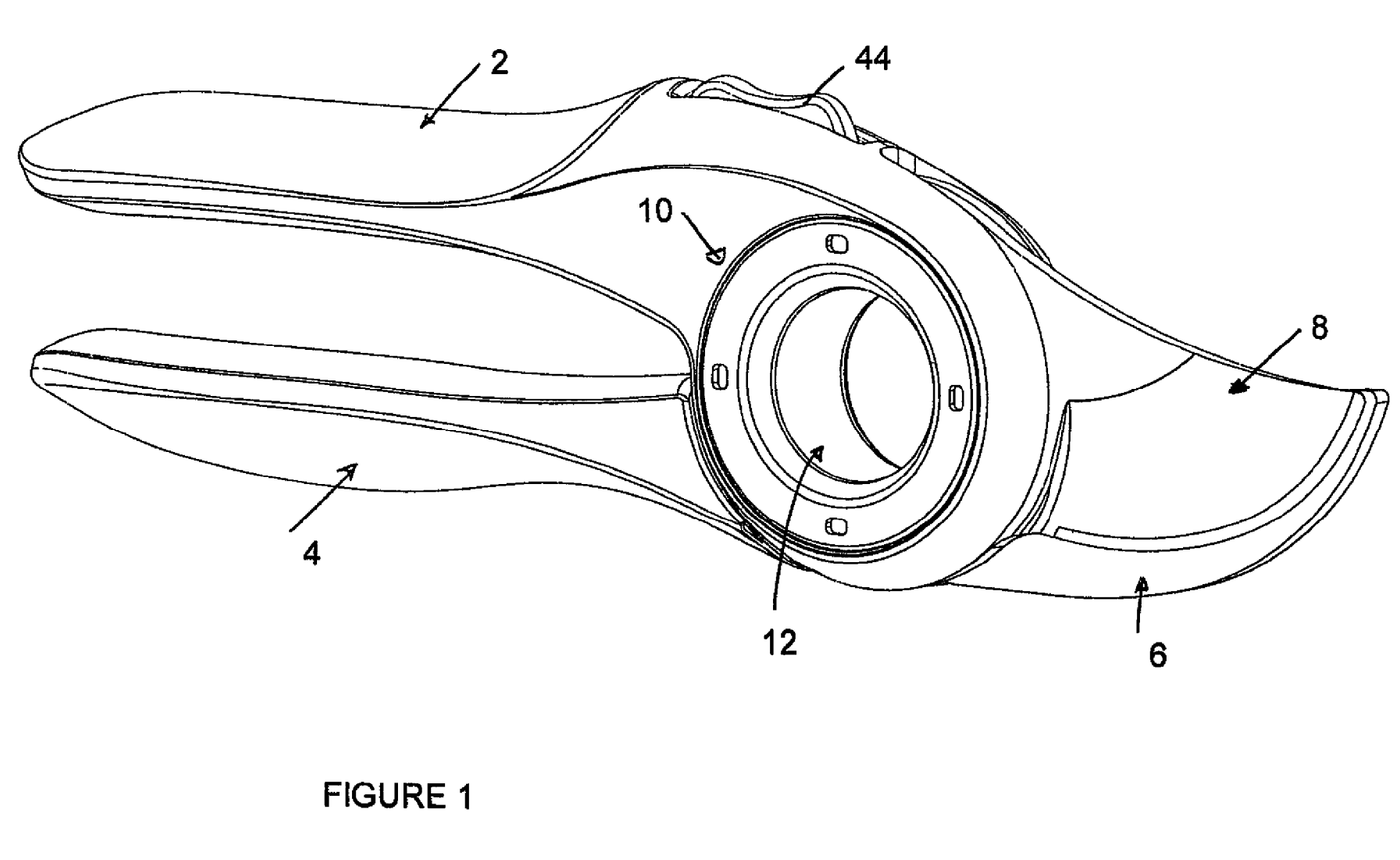
FIG. 1 is a perspective view of a bypass pruner in accordance with an embodiment of the invention.
Figure 2:
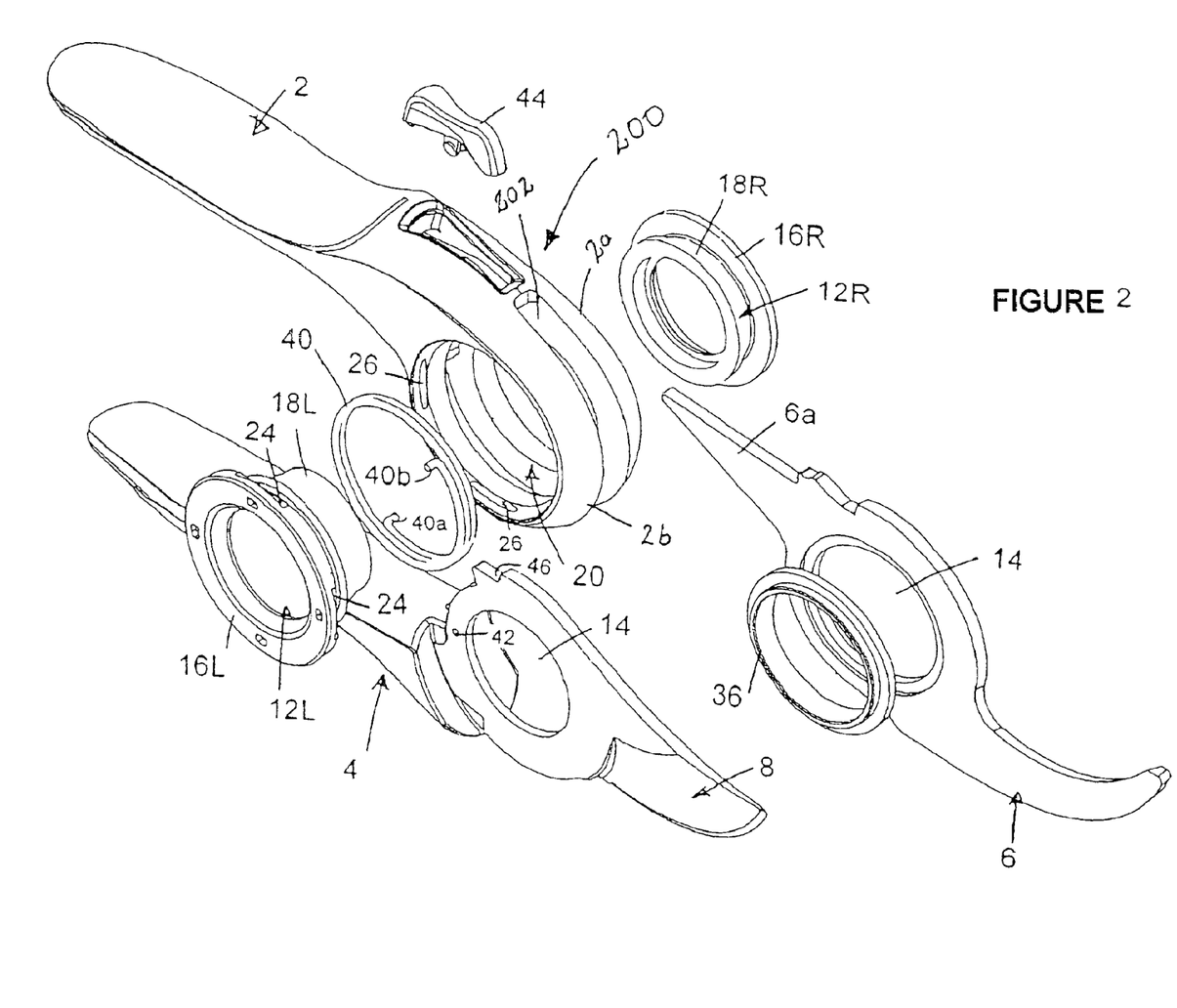
FIG. 2 is an exploded view of the pruner of FIG. 1.

Referring again to FIG. 1 to 4, the pivot assembly 10 comprises a two-part bush 12 of large diameter. As shown in FIG. 2, the moveable and static blades 8, 6 each include a large diameter aperture 14 by which it is mounted on the bush. The bush 12 comprises left hand and right hand parts 12L, 12R each having an outer annular flange 16L, 16R with an inwardly projecting axial sleeve 18L, 18R, the two parts of the bush being assembled by screwing the sleeve 18R of the right hand part onto the inner end of the sleeve 18L of the left hand part (the screw threads are not shown in the exploded view of FIG. 2). The static handle 2 is shaped at its inner end with a transverse passage 20 through which the sleeves 18L, 18R of the two parts extend, with the outer flange 16L, 16R of each part abutting against a corresponding side face of the static handle. In the embodiment shown, the outer flanges 16L, 16R are located in annular recesses in the side faces of the static jaw so that they are substantially flush therewith. The bush 12 of the pivot assembly is mounted to the static handle 2 in such a manner that it does not rotate relative thereto. In the embodiment shown this anti-rotation effect is achieved by forming on an enlarged diameter part of the sleeve 18L of the left hand part 12L immediately behind its annular flange 16L, a series of uniformly spaced flat zones 24 (as shown there are four such zones at 90° angular spacings) which engage with corresponding flat zones 26 within the adjacent part of the transverse passage 20 through the static handle. Accordingly when the bush 12 is assembled by inserting the left hand part 12L into the left hand end of the passage 20 and then the right hand part 12R into the right hand end of the passage, the left hand part 12L will be held against rotation by the engagement of the flat zones 24, 26, and the right hand part 12R can be screwed into engagement with the left hand part 12L to a condition in which the outer annular flanges 16L, 16R of the two parts are in tight engagement with the two sides of the static handle 2 whereby the pivot assembly is firmly anchored thereto.

A portion 200 of the static handle 2 is forked into a first sub-part 2a and a second sub-part 2b. The second sub-part 2b is spaced from the first sub-part 2a to define a circumferential slot 202 and a portion of the movable handle 4 being sandwiched between the first sub-part 2a and the second sub-part 2b.

Figure 4:
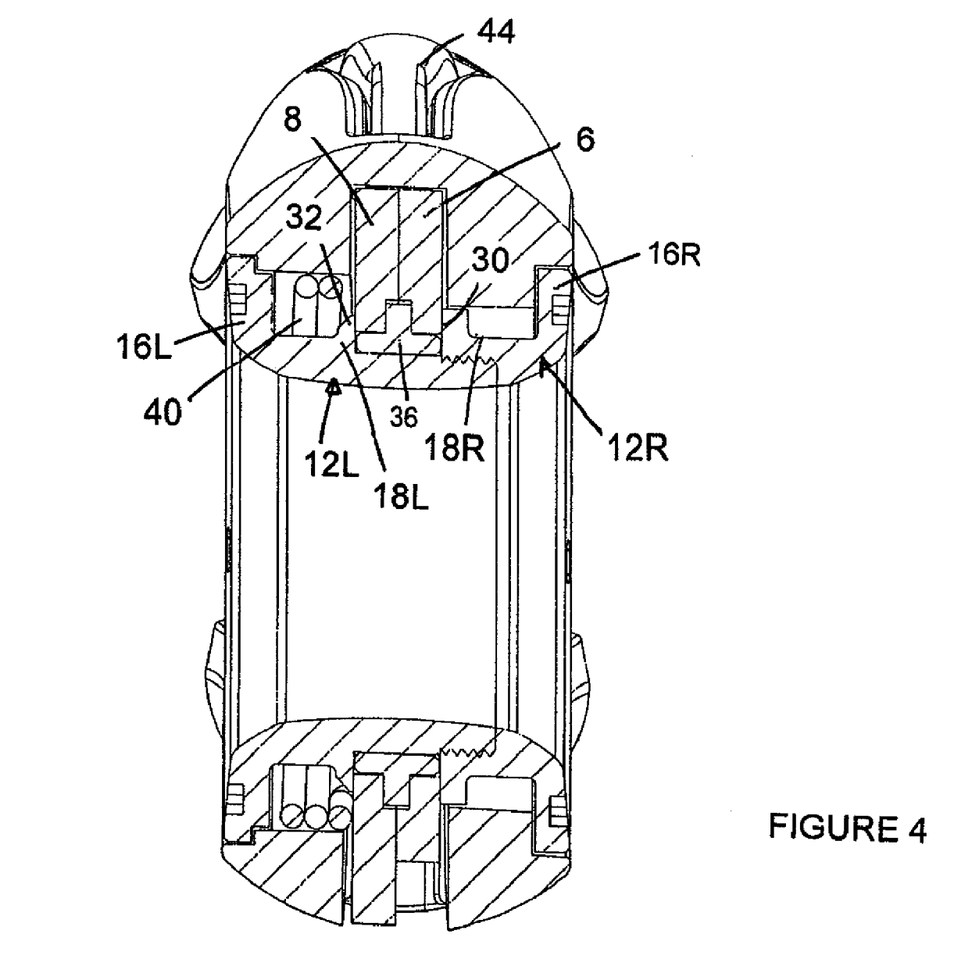
FIG. 4 is a transverse section through the pruner of FIG. 1 in the zone of the pivot assembly.

It will be seen from the cross-section of FIG. 4 that both blades are mounted on the sleeve 18L of the left hand part, between the end face 30 of the sleeve 18R and an annular flange 32 on the sleeve 18L. The two blades are mounted on the sleeve 18L by means of a bearing ring 36 of low friction bearing material, for example PTFE. The bearing ring 36 is of T-shaped cross-section which engages into the apertures of the two blades in the manner shown in FIG. 4 so that the axial part of the ring 36 provides bearing support for the moveable blade 8 from the sleeve 18L and the radial part of the ring 36 provides bearing support for the inner face of the moveable blade 8 relative to the adjacent face of the static blade 6. The two blades are firmly clamped between the end face 30 of sleeve 18R and the flange 32 of the sleeve 18L so that separation of the blades under high cutting load is resisted but the presence of the ring 36 and particularly its radial part ensures that the movable blade is still able to easily pivot. Although in the embodiment shown, the bearing ring is T-shaped and this is preferred nevertheless in other embodiments the bearing ring can be in the form of a simple bearing sleeve without the presence of the radial part between the blades.

Figure 3:
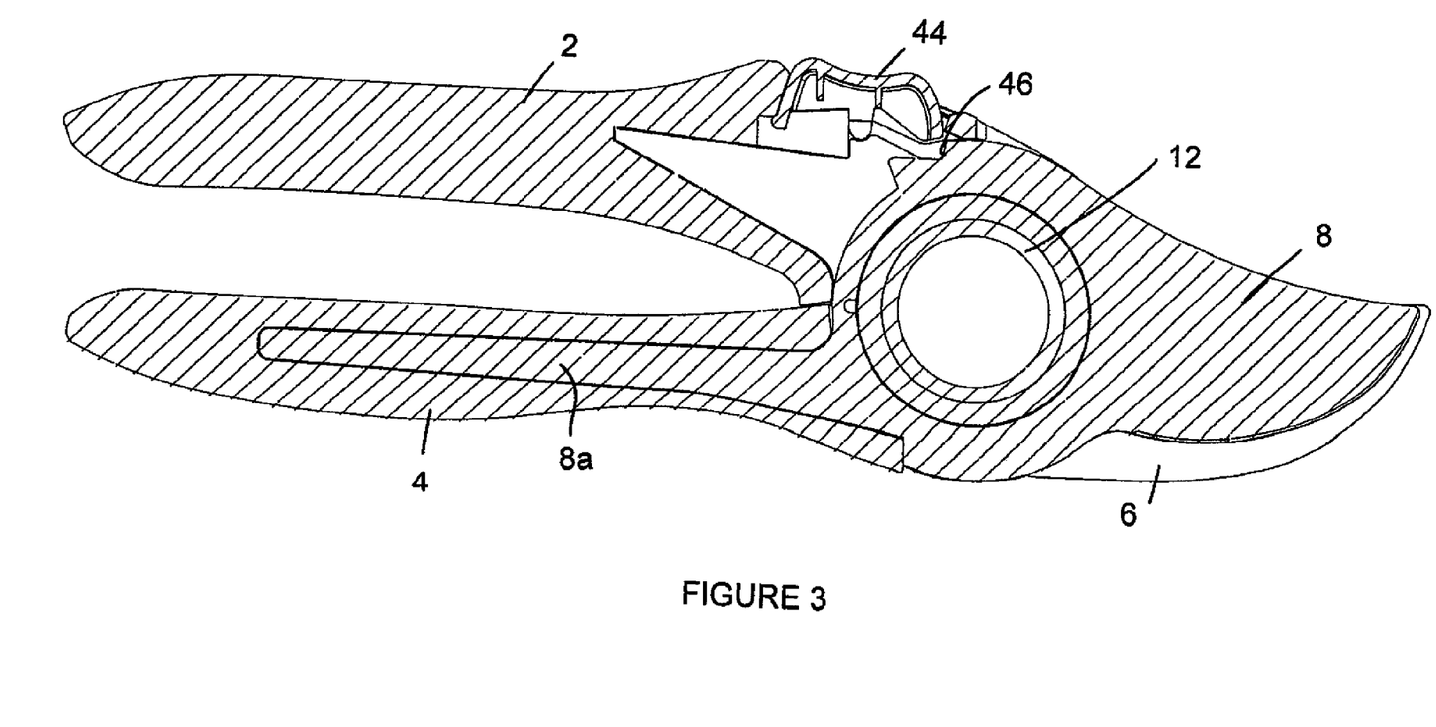
FIG. 3 is a longitudinal section through the pruner of FIG. 1.

The moveable handle/blade assembly can conveniently be produced by moulding the handle 4 directly onto an extension 8a of the moveable blade 8 (see FIG. 3). The static handle 2 is of somewhat more complex shape due to the presence of the transverse passage 20 for receiving the pivot assembly and for this reason it is unlikely to be practicable to mould the handle directly onto the static blade. Instead, the handle 2 and blade 6 are produced separately and the static blade 6 is then mounted to the handle 2 by engagement of a blade extension 6a. The subsequent incorporation of the pivot assembly which is securely attached to the static handle ensures, by its cooperation with the static blade, that the static blade is securely anchored to the handle. Due to its complex shape, it may be necessary for the static handle to be moulded in two parts assembled together.

As previously mentioned, the pivot assembly 10 also incorporates a spring which provides a pivotal bias about the axis of the pivot assembly to bias apart the static and moveable handle/blade assemblies. In the embodiment shown, the spring is a torsion spring in the form of a coil spring. The spring 40 is mounted on the sleeve 18L in the zone between the outer flange 16L and the inner annular flange 32 so as to be concentric therewith. The opposite ends of the spring 40 are formed with axially projecting parts 40a, 40b one of which (40a) engages into a hole 42 formed in the moveable blade and the other (40b) of which is engaged in a hole formed in the structure of the part 12L. Accordingly, when the moveable handle 4 is moved towards the static handle 2 so as to close the blade 8, the coil spring 40 will be tensioned so as to oppose that movement and return the moveable handle/blade assembly to its open position when the force is released.

It will be understood that the spring 40 is enclosed within the interior of the static handle by the presence of the bush 12 which is assembled to the static handle. Accordingly unlike spring arrangements in conventional pruners in which the spring is mounted externally and is exposed, the spring is shielded from contamination by dirt and water and will therefore not corrode and the effectiveness of the spring is unlikely to become impaired over the working life of the pruner. Moreover, as the spring is held captive within the interior of the static handle it cannot be separated from the pruner and become lost as may occur with so-called volute springs as incorporated in many conventional forms of pruner externally between the static and moveable handle. Also as the spring is not exposed, it cannot pinch the fingers of the user.

In order to lock the handles 2, 4 in a closed position against the bias of the spring 40, a pivotal lock button 44 is mounted in the static handle to engage behind a step 46 (see FIG. 3) on the moveable blade 8 when the forward part of the button 44 is depressed when the handles are in their closed position.

Although in the embodiment shown, the bush 12 is mounted wholly within the static handle (in the transverse passage thereof), in alternative embodiments, the bush 12 may extend through aligned transverse passages in the static and movable handle. In that case, although the spring will still be carried by the bush and will still be enclosed, it may be within either the static handle or the movable handle, or perhaps both.

The pivot assembly 10 provided by the two-part large-diameter bush 12 clamps the two blades laterally together and provides bearing support for the moveable blade 8 over a large surface area having significant radial displacement from its pivotal axis. Accordingly in comparison with pivot assemblies of conventional pruners and which consist of a bolt, pin or similar, the pruner of the invention should have smoother operation with greater stability as regards the mounting of the blades and in particular the moveable blade is far less likely to be forced laterally away from the static blade when cutting thick or tough branches.

Although the preferred embodiment of the invention has been described with reference to pruners of various type, a pivot assembly of the general form described can also be used to advantage in other forms of cutter for plant material involving the use of a pivotal cutting or shearing blade, as a result of the stable and smooth bearing support afforded by the pivot assembly. For example, the pivot assembly may be used in garden shears or hedging shears having handles each held in a different hand of the user. In that application although the pivot assembly will be substantially as described, the return torsion spring would not be required and would therefore be omitted. Another application would be in a lopper for tree branches of up to a predetermined thickness. Such a lopper may have two handles each held in a different hand of the user so that, again, the torsion spring would not be required or, alternatively, it could be of the type in which a static and moveable blade are mounted at one end of a pole (usually extendible) with the moveable blade being operated from ground level by a cord; in that case the torsion spring would be required so as to pivot the moveable blade back to its open position following closure by operation of the cord.

The embodiments have been described by way of example only and modifications are possible within the scope of the invention.

The invention claimed is:

1. A hand tool for cutting plant material, the tool comprising:
a first and a second co-operating blades interconnected by a pivot assembly whereby the second blade is pivotable relative to the first blade between an open position and a closed position;
a first handle carrying the first blade;
a second handle carrying the second blade;
a lock button disposed on the first handle;
wherein, when the lock button is in a locked position and the first and second blades are in the closed position, the lock button directly engages a step on the second blade to prevent the second blade from rotating relative to the first blade,
the pivot assembly comprising:
a bush on which both said blades are mounted with at least one of the blades being supported from the bush by a bearing ring of low friction-material; and
a spring disposed on the bush for pivotally biasing the two co-operating blades,
wherein
the bush comprises two threaded parts inter-engaging each other by one of the parts being directly screwed on to the other part so that the two blades are clamped together between opposed abutment faces on the two parts of the bush; and
said two parts along with the spring are located inside an opening defined by the first handle, said two threaded parts of the bush forming a hub defining a rotational axis for the movable handle/blade assembly;
the bearing ring has a T-shaped cross-section comprising:
an axial part extending in an axial direction of the hub and disposed between the bush on one side and both the blades on the other side, and
a radial part extending radially outwardly from the hub from a middle portion of the axial part and arranged between adjacent opposed faces of the first and second blades;
wherein each of the blades is rotatably supported on the bush by the axial part and rotatably supported on the other blade by the radial part.

2. The hand tool according to claim 1, wherein the tool is a pruner having said first handle which is static and said second handle which is movable, wherein said spring biases the second blade to the open position.

3. The hand tool according to claim 2, wherein the spring is a torsion spring mounted concentrically on the bush.

4. The hand tool according to claim 3, wherein the pivot assembly is mounted inside the first handle, the bush passing through a transverse passage at the inner end portion of the first handle and being fixed to the first handle against rotation relative thereto, and the spring is enclosed within the transverse passage of the first handle and is shielded by the bush against detachment and against direct exposure to dirt and water.

5. The hand tool according to claim 1, wherein a majority of said two parts of said bush along with the spring is located inside the hub.

6. The hand tool according to claim 1, wherein said bush is hollow along an axis of the hub.

* * * * *